United States Patent
Sonoda et al.

(10) Patent No.: US 9,614,397 B2
(45) Date of Patent: Apr. 4, 2017

(54) BATTERY CHARGING APPARATUS FOR VEHICLE

(71) Applicant: HONDA MOTOR CO., LTD., Tokyo (JP)

(72) Inventors: Yutaka Sonoda, Wako (JP); Katsuhiro Ouchi, Wako (JP); Kazuhiko Ono, Wako (JP); Keishi Takayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 245 days.

(21) Appl. No.: 14/613,358

(22) Filed: Feb. 4, 2015

(65) Prior Publication Data

US 2015/0229159 A1    Aug. 13, 2015

(30) Foreign Application Priority Data

Feb. 7, 2014  (JP) .................................. 2014-022752
Nov. 25, 2014 (JP) .................................. 2014-238129

(51) Int. Cl.
*H02J 7/14* (2006.01)
*H02P 9/04* (2006.01)

(52) U.S. Cl.
CPC .......... *H02J 7/1484* (2013.01); *H02J 7/1492* (2013.01); *H02P 9/04* (2013.01); *Y02T 10/7005* (2013.01)

(58) Field of Classification Search
CPC .......... H02J 7/1484; H02J 7/1492; H02P 9/04
USPC .......................................... 320/137
See application file for complete search history.

(56) References Cited

U.S. PATENT DOCUMENTS

| | | | | |
|---|---|---|---|---|
| 4,347,570 A | * | 8/1982 | Akiyama | F02D 41/26 123/406.65 |
| 4,348,619 A | * | 9/1982 | Ray | B60L 11/1803 307/149 |
| 5,065,086 A | * | 11/1991 | Takakado | F02N 11/04 290/46 |
| 5,115,183 A | * | 5/1992 | Kyoukane | B60K 6/46 180/65.245 |
| 5,225,712 A | * | 7/1993 | Erdman | F03D 7/0272 290/44 |

(Continued)

FOREIGN PATENT DOCUMENTS

JP         2013-145616         7/2013

*Primary Examiner* — Robert Grant
*Assistant Examiner* — John Trischler
(74) *Attorney, Agent, or Firm* — Mori & Ward, LLP (57) ABSTRACT

A battery charging apparatus for a vehicle includes a driver, a position detector, and a controller. The driver includes switching elements to convert three-phase AC power outputted from a winding of each phase of a stator of a three-phase AC generator into DC power to supply the DC power to a battery. The position detector is configured to output a position detection signal indicating a position of a rotor of the three-phase AC generator. The controller is configured to control the switching elements to be switched between an energized state and non-energized state. The controller is configured to have a maintenance period during a period until next input of the position detection signal if the period exceeds an energization period. The switching elements are to be maintained in the maintenance period in the energized state or non-energized state immediately before the period exceeding the energization period.

24 Claims, 9 Drawing Sheets

(56) References Cited

U.S. PATENT DOCUMENTS

| | | | | |
|---|---|---|---|---|
| 5,256,959 A | * | 10/1993 | Nagano | H02J 7/1446 320/123 |
| 5,289,099 A | * | 2/1994 | Bahn | H02P 6/085 318/400.38 |
| 5,543,703 A | * | 8/1996 | Kusase | H01L 29/7803 180/65.245 |
| 5,608,309 A | * | 3/1997 | Hikita | H02J 7/1446 320/DIG. 10 |
| 5,650,713 A | * | 7/1997 | Takeuchi | B60K 6/46 180/65.245 |
| 5,723,967 A | * | 3/1998 | Hongo | H02P 6/21 318/400.11 |
| 5,726,557 A | * | 3/1998 | Umeda | H02J 7/14 320/104 |
| 5,793,167 A | * | 8/1998 | Liang | H02P 9/48 318/141 |
| 5,841,266 A | * | 11/1998 | Hikita | H02J 13/002 307/10.1 |
| 5,859,520 A | * | 1/1999 | Bourgeois | H02P 6/15 318/400.12 |
| 5,905,360 A | * | 5/1999 | Ukita | B60K 6/28 320/118 |
| 5,908,453 A | * | 6/1999 | Tabata | B60L 3/00 320/132 |
| 5,929,577 A | * | 7/1999 | Neidorff | H02P 6/182 318/400.24 |
| 5,936,312 A | * | 8/1999 | Koide | B60K 6/26 290/38 R |
| 6,049,194 A | * | 4/2000 | Nakagawa | H02M 7/219 322/20 |
| 6,057,671 A | * | 5/2000 | Kuno | H02J 7/0091 320/130 |
| 6,067,960 A | * | 5/2000 | Watanabe | F02D 11/10 123/399 |
| 6,087,734 A | * | 7/2000 | Maeda | B60K 6/40 180/65.21 |
| 6,166,449 A | * | 12/2000 | Takaoka | B60K 6/26 290/40 A |
| 6,215,271 B1 | * | 4/2001 | Lerow | H02J 7/1492 320/104 |
| 6,218,804 B1 | * | 4/2001 | Toriyama | H02J 7/1446 123/198 R |
| 6,239,582 B1 | * | 5/2001 | Buzan | H02J 7/1492 320/137 |
| 6,278,195 B1 | * | 8/2001 | Yamaguchi | B60K 6/38 290/40 A |
| 6,437,456 B1 | * | 8/2002 | Kimura | B60K 6/445 290/40 C |
| 6,489,692 B1 | * | 12/2002 | Gilbreth | F01D 25/16 290/40 D |
| 6,693,403 B2 | * | 2/2004 | Chen | H02P 25/08 318/701 |
| 6,757,598 B2 | * | 6/2004 | Okoshi | B60K 6/365 180/65.1 |
| 6,794,847 B2 | * | 9/2004 | Hosoda | B60K 6/28 320/104 |
| 6,806,671 B2 | * | 10/2004 | Kusaka | B60L 1/00 318/108 |
| 6,825,575 B1 | * | 11/2004 | Edelson | B60L 11/04 290/40 B |
| 6,902,018 B2 | * | 6/2005 | Hisada | B60K 6/445 180/65.1 |
| 7,026,774 B2 | * | 4/2006 | Inaba | H02P 6/185 318/400.33 |
| 7,057,361 B2 | * | 6/2006 | Kitahata | H02M 5/458 318/139 |
| 7,088,065 B2 | * | 8/2006 | Ishikawa | B60L 7/26 307/48 |
| 7,102,331 B2 | * | 9/2006 | Walter | H02M 5/22 320/123 |
| 7,105,938 B2 | * | 9/2006 | Edelson | B60L 11/04 180/65.22 |
| 7,170,261 B2 | * | 1/2007 | Walter | H02M 5/22 320/123 |
| 7,218,118 B1 | * | 5/2007 | Gonring | G01R 31/3693 320/128 |
| 7,227,332 B2 | * | 6/2007 | Suzuki | B60L 3/0023 180/65.265 |
| 7,332,882 B2 | * | 2/2008 | Aoyagi | B60L 11/1851 318/139 |
| 7,400,111 B2 | * | 7/2008 | Kishibata | H01M 2/0245 320/104 |
| 7,420,295 B2 | * | 9/2008 | Omae | H01M 6/36 307/66 |
| 7,431,111 B2 | * | 10/2008 | Nada | B60K 6/445 180/65.28 |
| 7,443,044 B2 | * | 10/2008 | Shimazaki | F02N 11/00 290/38 R |
| 7,471,003 B2 | * | 12/2008 | Kobayashi | B60K 6/48 123/399 |
| 7,508,087 B2 | * | 3/2009 | Tsujimoto | H02J 7/1492 290/40 C |
| 7,584,813 B2 | * | 9/2009 | Yoshida | B60K 6/48 180/65.285 |
| 7,728,557 B2 | * | 6/2010 | Iwatsuki | B60L 7/16 320/136 |
| 7,905,813 B2 | * | 3/2011 | Edelson | B60L 11/04 477/110 |
| 7,906,864 B2 | * | 3/2011 | Ko | H02J 7/1446 290/40 C |
| 7,928,676 B2 | * | 4/2011 | Fujita | H02P 6/08 318/400.26 |
| 7,982,324 B2 | * | 7/2011 | Saito | H02P 9/02 123/51 A |
| 7,982,435 B2 | * | 7/2011 | Masuda | B60K 6/365 320/132 |
| 8,049,349 B2 | * | 11/2011 | Saito | H02P 6/16 290/24 |
| 8,098,041 B2 | * | 1/2012 | Kokotovich | B60K 6/365 320/104 |
| 8,127,874 B2 | * | 3/2012 | Suzui | B60K 6/365 180/65.21 |
| 8,140,280 B2 | * | 3/2012 | Kasai | B62D 5/0481 320/134 |
| 8,159,179 B2 | * | 4/2012 | Suzuki | H02J 7/163 320/104 |
| 8,204,651 B2 | * | 6/2012 | Tachibana | B62D 5/0457 180/402 |
| 8,229,612 B2 | * | 7/2012 | Itoh | B60K 6/365 180/65.1 |
| 8,248,023 B2 | * | 8/2012 | Schwenke | B60K 6/26 320/104 |
| 8,249,769 B2 | * | 8/2012 | Itoh | B60K 6/365 180/65.1 |
| 8,253,359 B2 | * | 8/2012 | Tanaka | B60K 6/365 180/65.285 |
| 8,288,998 B2 | * | 10/2012 | Masuda | H01M 10/486 180/65.1 |
| 8,305,018 B2 | * | 11/2012 | Okamura | B60K 6/445 318/370 |
| 8,442,727 B2 | * | 5/2013 | Yamamoto | B60K 6/442 320/109 |
| 8,570,004 B2 | * | 10/2013 | Asada | H02J 7/1492 322/28 |
| 8,579,059 B2 | * | 11/2013 | Teraya | B60K 6/445 180/65.25 |
| 8,582,294 B2 | * | 11/2013 | Guerin | H01G 2/04 320/107 |
| 8,618,681 B2 | * | 12/2013 | Yamamura | H02P 27/08 290/40 A |
| 8,694,185 B2 | * | 4/2014 | Sakamoto | B60L 11/1861 320/131 |
| 8,744,676 B2 | * | 6/2014 | Sakamoto | G01R 31/3693 320/127 |
| 8,754,607 B2 | * | 6/2014 | Shimamura | B60L 3/04 180/65.1 |
| 8,810,051 B2 | * | 8/2014 | Yamamura | F02N 11/04 290/1 R |

(56) References Cited

U.S. PATENT DOCUMENTS

| | | | | |
|---|---|---|---|---|
| 8,810,052 B2* | 8/2014 | Kishibata | G05B 19/00 | 257/706 |
| 8,836,289 B2* | 9/2014 | Flett | H02P 27/08 | 318/400.26 |
| 8,890,449 B2* | 11/2014 | Suzuki | B25F 5/00 | 173/15 |
| 8,896,275 B2* | 11/2014 | Horihata | H02J 7/1492 | 322/28 |
| 8,917,058 B2* | 12/2014 | Hirai | H02J 7/1423 | 307/150 |
| 8,922,152 B2* | 12/2014 | Kawamura | H03K 17/0828 | 180/65.21 |
| 9,007,028 B2* | 4/2015 | Tashiro | B60L 15/2045 | 320/132 |
| 9,112,441 B2* | 8/2015 | Yamashita | H02P 9/04 | |
| 9,290,099 B2* | 3/2016 | Sonoda | B60L 3/0038 | |
| 2002/0101217 A1* | 8/2002 | Hosoda | B60K 6/28 | 320/124 |
| 2002/0149205 A1* | 10/2002 | Gilbreth | F01D 25/16 | 290/1 R |
| 2003/0137275 A1* | 7/2003 | Suzuki | B60L 3/0023 | 320/104 |
| 2003/0189339 A1* | 10/2003 | Gupta | F01D 15/10 | 290/52 |
| 2004/0169481 A1* | 9/2004 | Wakitani | A01D 34/78 | 318/376 |
| 2004/0227348 A1* | 11/2004 | Wakitani | B60K 6/46 | 290/31 |
| 2005/0116474 A1* | 6/2005 | Edelson | B60L 11/04 | 290/40 A |
| 2005/0236837 A1* | 10/2005 | Kusumi | F02N 11/04 | 290/36 R |
| 2006/0022623 A1* | 2/2006 | Inaba | H02P 6/185 | 318/400.02 |
| 2006/0043736 A1* | 3/2006 | Sriram | F02N 11/04 | 290/37 R |
| 2006/0186670 A1* | 8/2006 | Hudson | F03D 9/003 | 290/44 |
| 2006/0202481 A1* | 9/2006 | Yasui | H02P 21/14 | 290/40 R |
| 2006/0279086 A1* | 12/2006 | Kishibata | H01M 2/0245 | 290/31 |
| 2007/0145942 A1* | 6/2007 | Yamamoto | H02J 7/1446 | 320/104 |
| 2008/0143113 A1* | 6/2008 | Ichinose | H02P 9/007 | 290/44 |
| 2008/0177444 A1* | 7/2008 | Tachibana | B62D 5/0457 | 701/41 |
| 2008/0225565 A1* | 9/2008 | Tsujimoto | H02J 7/1492 | 363/127 |
| 2008/0238108 A1* | 10/2008 | Edelson | B60L 11/04 | 290/40 C |
| 2008/0272717 A1* | 11/2008 | Gleason | B60K 6/365 | 318/139 |
| 2009/0058366 A1* | 3/2009 | Masuda | B60K 6/445 | 320/135 |
| 2009/0115378 A1* | 5/2009 | Ko | H02J 7/1446 | 322/25 |
| 2009/0160408 A1* | 6/2009 | Suzuki | H02J 7/163 | 320/164 |
| 2009/0167095 A1* | 7/2009 | Rivas | F03D 7/0224 | 307/87 |
| 2009/0184681 A1* | 7/2009 | Kuno | B60K 6/365 | 320/128 |
| 2009/0266630 A1* | 10/2009 | Soma | B60L 11/123 | 180/65.265 |
| 2009/0284022 A1* | 11/2009 | Usselman | F02D 29/06 | 290/38 R |
| 2009/0309537 A1* | 12/2009 | Saito | B60L 11/1811 | 320/101 |
| 2009/0322270 A1* | 12/2009 | Fujita | H02P 6/08 | 318/400.38 |
| 2010/0079111 A1* | 4/2010 | Masuda | H01M 10/486 | 320/134 |
| 2010/0213904 A1* | 8/2010 | Yamada | B60L 3/003 | 320/166 |
| 2010/0283242 A1* | 11/2010 | Dooley | F02C 7/268 | 290/31 |
| 2011/0057618 A1* | 3/2011 | Izumi | B60K 6/365 | 320/129 |
| 2011/0175580 A1* | 7/2011 | Asada | H02J 7/1492 | 322/45 |
| 2011/0198846 A1* | 8/2011 | Wakasa | F03D 7/0272 | 290/44 |
| 2011/0285358 A1* | 11/2011 | Grant | F02B 63/04 | 320/150 |
| 2012/0068671 A1* | 3/2012 | Horihata | H02J 7/1492 | 322/94 |
| 2012/0081080 A1* | 4/2012 | Aoki | B62M 6/45 | 320/137 |
| 2012/0292920 A1* | 11/2012 | Yamamura | H02P 27/08 | 290/40 B |
| 2012/0293124 A1* | 11/2012 | Hirai | H02J 7/1423 | 320/112 |
| 2013/0043844 A1* | 2/2013 | Tashiro | B60L 15/2045 | 320/128 |
| 2013/0106368 A1* | 5/2013 | Yamashita | H02P 9/04 | 322/89 |
| 2013/0271077 A1* | 10/2013 | Kim | B60L 11/1811 | 320/109 |
| 2014/0062409 A1* | 3/2014 | Endo | H02J 7/0029 | 320/126 |
| 2014/0070769 A1* | 3/2014 | Harada | H02P 9/48 | 320/109 |
| 2014/0217974 A1* | 8/2014 | Kim | B60L 11/1812 | 320/109 |
| 2014/0257614 A1* | 9/2014 | Niizuma | B60L 11/182 | 701/22 |
| 2014/0300318 A1* | 10/2014 | Sonoda | B60L 3/0038 | 320/109 |
| 2015/0303737 A1* | 10/2015 | Steinbuchel, IV | B60L 3/0069 | 320/109 |
| 2015/0303843 A1* | 10/2015 | Fuwa | H02P 6/182 | 318/400.38 |
| 2016/0020443 A1* | 1/2016 | White | H02J 7/0024 | 318/245 |
| 2016/0075240 A1* | 3/2016 | Inoue | H02J 50/10 | 320/108 |

\* cited by examiner

BATTERY CHARGING APPARATUS FOR VEHICLE

CROSS-REFERENCE TO RELATED APPLICATIONS

The present application claims priority under 35 U.S.C. §119 to Japanese Patent Application No. 2014-022752, filed Feb. 7, 2014 and Japanese Patent Application No. 2014-238129, filed Nov. 25, 2014. The contents of these applications are incorporated herein by reference in their entirety.

BACKGROUND OF THE INVENTION

Field of the Invention

The present invention relates to a battery charging apparatus for a vehicle.

Discussion of the Background

A battery charging apparatus for a vehicle which determines the timing of energization for a switching element corresponding to each phase of a three-phase AC generator on the basis of an output signal of a position detection sensor for detecting the position of a rotor of the three-phase AC generator and generates electricity to charge a battery (for example, see JP-A No. 2012-005246).

SUMMARY OF THE INVENTION

According to one aspect of the present invention, a battery charging apparatus for a vehicle includes a driver unit, a control unit, and a position detection unit. The driver unit converts three-phase AC power outputted from a winding of each phase of a stator of a three-phase AC generator into DC power using a plurality of switching elements to supply the DC power to a battery. The control unit controls switching between an energized state and non-energized state of each of the plurality of switching elements. The position detection unit outputs a position detection signal indicating a position of a rotor of the three-phase AC generator. The control unit obtains a next estimation power generation period of the three-phase AC generator on the basis of the previous position detection signal and determines a next energization period of each of the plurality of switching elements on the basis of the estimation power generation period. The control unit judges start of the energization period on the basis of input of the position detection signal. If a period until next input of the position detection signal exceeds the energization period, during the period until the next input of the position detection signal, the control unit has a maintenance period in which the plurality of switching elements are maintained in the energized state or non-energized state immediately before the period until the next input of the position detection signal exceeds the energization period.

According to another aspect of the present invention, a battery charging apparatus for a vehicle includes a driver, a position detector, and a controller. The driver includes switching elements to convert three-phase AC power outputted from a winding of each phase of a stator of a three-phase AC generator into DC power to supply the DC power to a battery. The position detector is configured to output a position detection signal indicating a position of a rotor of the three-phase AC generator. The controller is configured to control the switching elements to be switched between an energized state and non-energized state. The controller is configured to obtain an estimation power generation period of the three-phase AC generator based on the position detection signal, to determine an energization period of each of the switching elements based on the estimation power generation period, and to determine start of the energization period based on input of the position detection signal. The controller is configured to have a maintenance period during a period until next input of the position detection signal if the period exceeds the energization period. The switching elements are to be maintained in the maintenance period in the energized state or non-energized state immediately before the period exceeding the energization period.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Hereinafter, a battery charging apparatus for a vehicle according to an embodiment of the present invention will be described in detail with reference to the accompanying drawings.

It should be noted that the "energization period" is equivalent to one period (electrical angle of 360°) of repetition of an energization pattern showing the energization or non-energization of each of a plurality of switching elements. It should be also noted that the "power generation period" is equivalent to a generator output period corresponding to an electrical angle of 360°.

<Battery Charging Apparatus>

Figure 1:
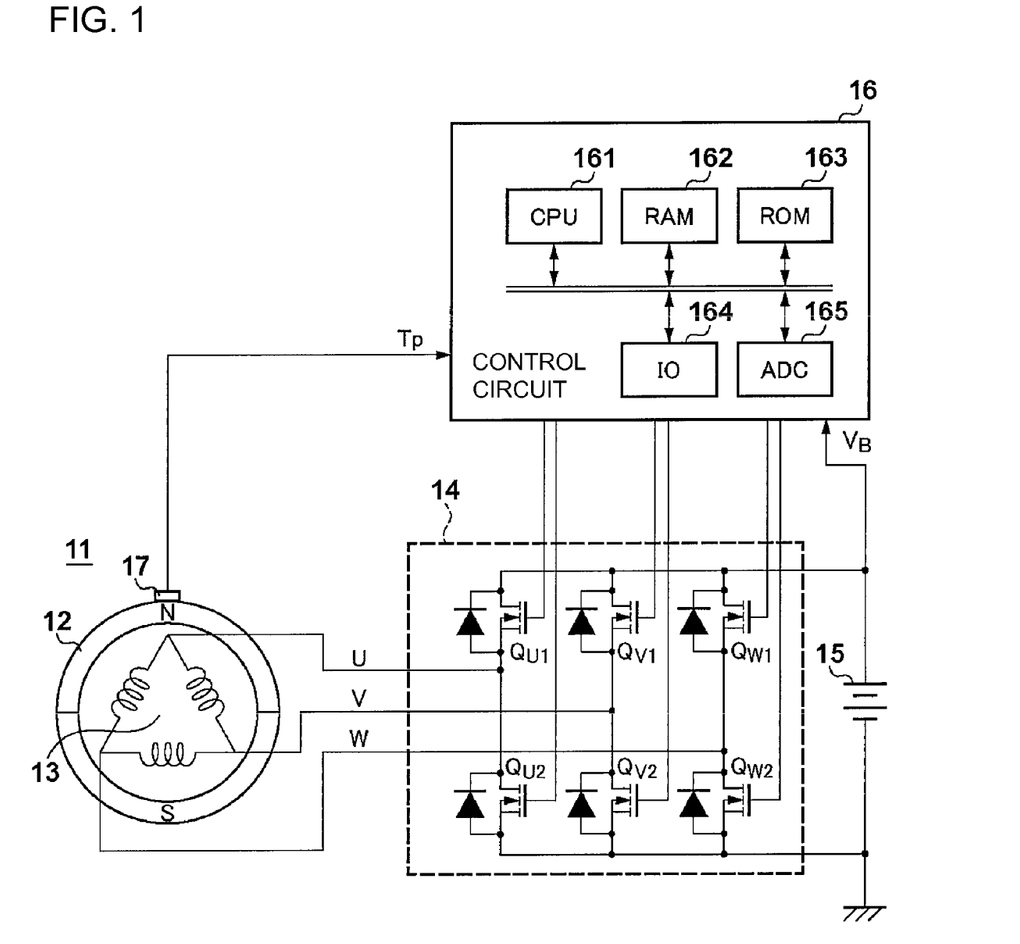
FIG. 1 illustrates the electrical connection between a three-phase AC generator and a battery charging apparatus.

FIG. 1 illustrates the electrical connection between a three-phase AC generator and a battery charging apparatus.

A three-phase AC generator (hereinafter referred to as the generator) 11 shown in FIG. 1 is a magnet generator driven by a prime mover such as an internal combustion engine. The magnet generator has: a rotor (rotator) 12 in which a magnetic field is formed by attaching permanent magnets to a yoke; and a stator (stationary part) 13 that is composed of an armature core and armature windings wound around the core. The rotor 12 is attached to a rotating shaft of the prime mover, and the stator 13 is fixed to an attaching portion that is attached to a case, a cover and the like of the prime mover.

The three-phase AC power outputted by the armature windings of the generator 11 is converted into DC power by a driver 14 that includes a full-wave rectifier, and is supplied to a battery 15 that is a secondary battery so as to charge the battery 15. Note that although an example of delta connection of the armature windings is shown in FIG. 1, a star connection is also possible.

In charging the battery 15, a control circuit 16 applies a control voltage to the armature windings by controlling the energization or non-energization of the switching elements arranged in parallel with diodes of the driver 14, and controls the output voltage of the generator 11 so as to obtain a voltage appropriate as a charging voltage of the battery 15. That is, the control circuit 16 detects a terminal voltage $V_B$ of the battery 15 and controls the energization or non-energization of a plurality of switching elements of the driver 14 so that the terminal voltage $V_B$ becomes a predetermined voltage $V_T$.

A position detection unit 17 includes a reluctor that is fixed to the rotor 12 of the generator 11 and a pulse generator that is fixed to an attaching portion of the generator 11 for example so as to oppose the reluctor. The position detection unit 17 produces a position detection signal Tp indicating the detection of the reluctor every time the reluctor that rotates along with the rotor 12 passes near the pulse generator.

A CPU 161 of the control circuit 16 executes control of each part of the vehicle by executing various control programs stored in a ROM 163 with a RAM 162 as a work memory. The control programs include the program regarding the charge control according to this embodiment. The control circuit 16 has an analog-digital converter (ADC) 165 for detecting the terminal voltage $V_B$ of the battery 15. Further, the control circuit 16 has an input-output port (IO) 164 for outputting a drive signal to control the energization or non-energization of each switching element of the driver 14 and inputting the position detection signal Tp outputted by the position detection unit 17.

<Outline of Charge Control>

Figure 2A:
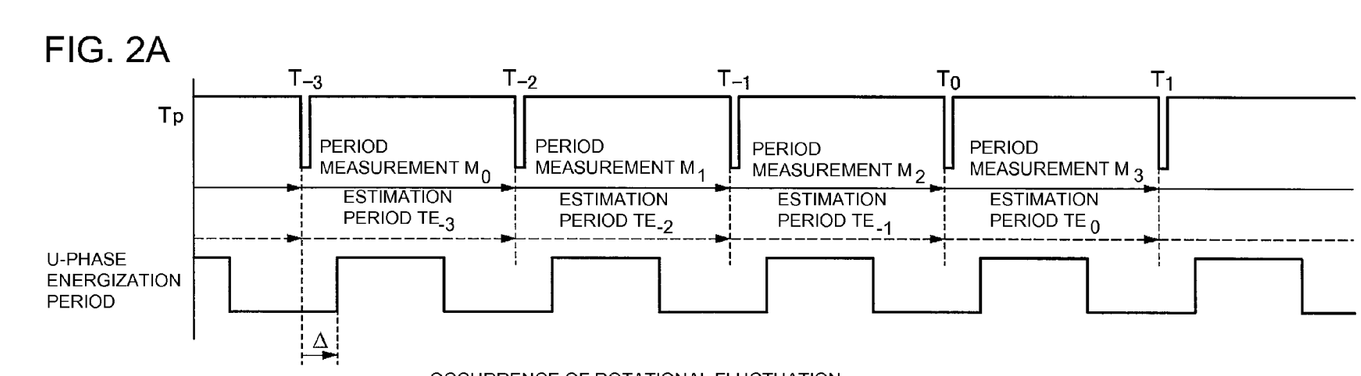
FIGS. 2A and 2B are a timing chart for illustrating the outline of charge control by the battery charging apparatus.
Figure 2B:
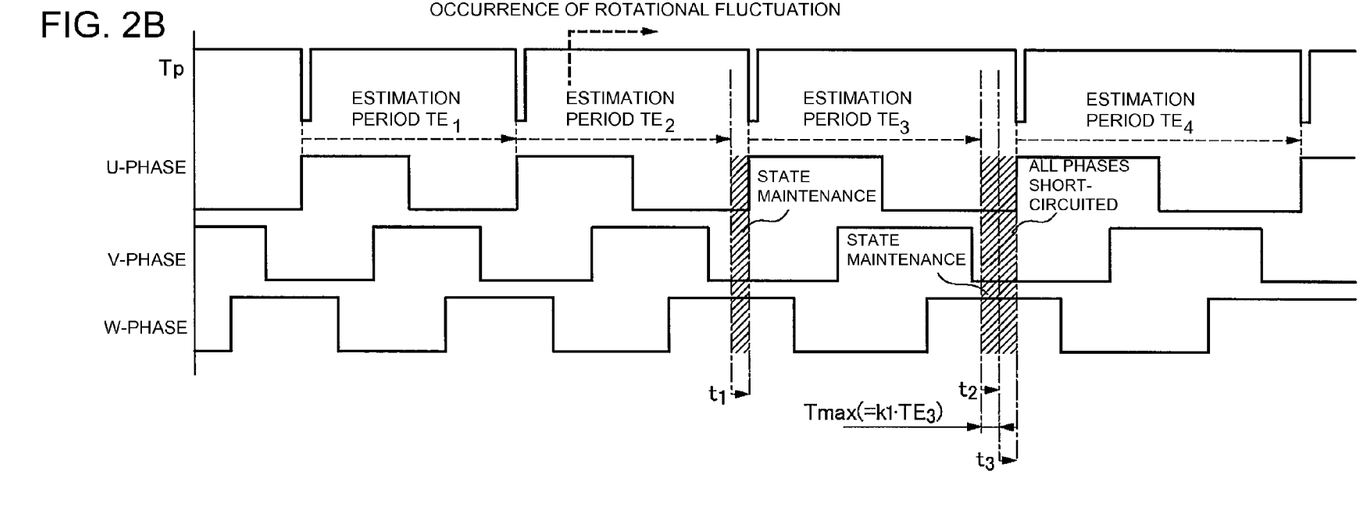

FIGS. 2A and 2B are a timing chart for illustrating the outline of charge control by the battery charging apparatus.

FIG. 2A shows the relationship between the position detection signal Tp and the energization period of, for example, a U phase, when prime-mover speed Ne is in a stable state. FIG. 2A shows a state in which the position detection signal Tp falls at every electrical angle of 360°, and thereafter, the energization period of the U phase starts when the electrical angle is advanced by a predetermined angle, and ends when the electrical angle is further advanced by 180°.

The CPU 161 measures the power generation period of the generator 11 by detecting the falling of the position detection signal Tp and measuring an interval between falling edges of the position detection signal Tp, and estimates a next power generation period from the measurement result. It should be noted that, hereinafter, the detection of falling of the position detection signal Tp by the CPU 161 is simply referred to as "detection of Tp", "input of Tp" or the like. It should be also noted that the estimated power generation period is referred to as the "estimation period".

The next power generation period (estimation period $TE_{-2}$ shown in FIG. 2A) may be estimated from the result of period measurement $M_0$ shown in FIG. 2A, but is preferably estimated by including the measurement results of a previous power generation period in consideration of fluctuation in the rotational speed Ne. More specifically, whether the rotational speed Ne is on an upward trend or downward trend is judged from the measurement results of the previous power generation period, and, with the judgment result taken into consideration, the power generation period is estimated. For example, in FIG. 2A, an estimation period $TE_0$ is estimated from the results of period measurements $M_0$ to $M_2$.

The reference timing for starting the energization period is, for example, the timing at which the induction voltage of the U phase is inverted from negative polarity to positive polarity (hereinafter, referred to as the inversion from negative to positive). FIG. 2A shows an example where there is a slight difference between the detection timing of Tp and the reference timing for starting the energization period which corresponds to the timing of inversion from negative to positive of the U phase. This difference in timing is related to the location of the position detection unit 17, and the electrical angle corresponding to the timing difference is always constant. Furthermore, this timing is changed by performing advance/retard control of the energization period. The advance/retard control will be described later. Therefore, if an estimation period TE is obtained, it is possible to estimate at which timing the U phase is to be inverted from negative to positive after the detection of Tp. For example, when the electrical angle corresponding to the timing difference is defined as Δ, the point of time when TE·Δ/360 seconds elapses from start of time counting upon detection of Tp can be set as the reference timing for starting the energization period.

FIGS. 3A to 3D show energization patterns of the switching elements of the driver 14. In FIGS. 3A to 3D, the energization patterns for one energization period are shown, wherein "ON" indicates a closed state (ON, an energized state) of the switching element and "OFF" indicates an open state (OFF, an non-energized state) of the switching element.

Figures 3A, 3B:
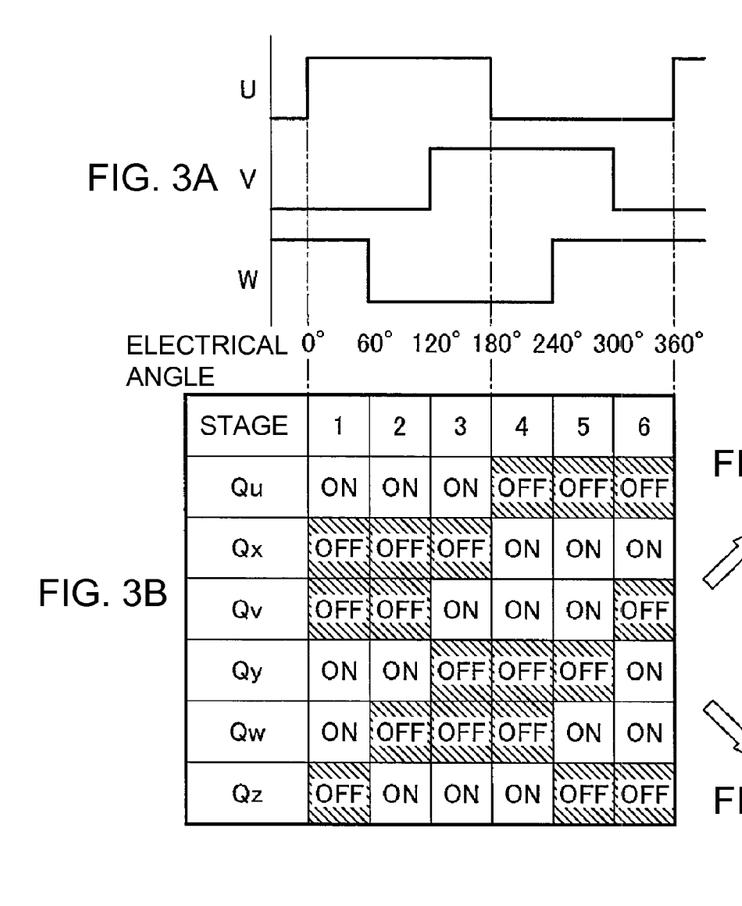
FIGS. 3A to 3D show energization patterns of switching elements.

FIG. 3A schematically shows an induction voltage of each phase of U, V, and W. When the timing at which the induction voltage of the U phase is inverted from negative to positive is defined as an electrical angle of 0°, the induction voltages of the V and W phases are inverted from negative to positive at 120° and 240°, respectively.

Since the energization control of each switching element needs to be performed on the basis of the positive/negative inversion of the induction voltage, the relationship between opening and closing of each switching element can be summarized as an energization pattern shown in FIG. 3B. As shown in FIG. 3B, the energization pattern defines first to sixth stages for phase divisions each having an electrical angle of 60° which are obtained by dividing one period of each phase into six equal parts. The CPU 161 produces a drive signal of each switching element while shifting the first to sixth stages in this order with the detection of Tp as a reference. It should be noted that the period of each stage is calculated by TE/6 (=TE·60/360) with respect to the estimation period TE. It should be noted that the phase division of each stage is not limited to an electrical angle of 60°, but may be an electrical angle of less than 60°, such as an electrical angle of 30°.

In this manner, the energization/non-energization switching order of each of the plurality of switching elements in the energization period is determined in accordance with the energization pattern.

Figure 3C:
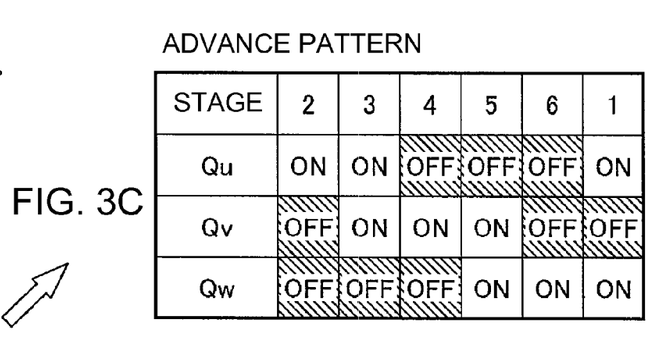
Figure 3D:
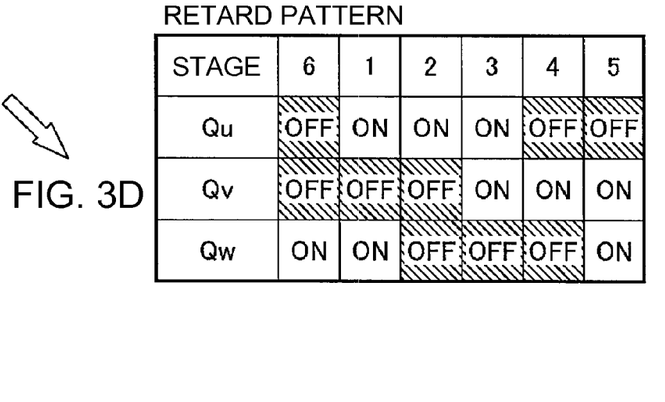

The energization pattern shown in FIG. 3B is a reference energization pattern. On the other hand, FIGS. 3C and 3D show an advance pattern and a retard pattern, respectively, which can be set at the time of controlling the amount of power generation. It should be noted that energization patterns for switching elements $Q_{U2}$, $Q_{V2}$, and $Q_{W2}$ are formed by inverting those for switching elements $Q_{U1}$, $Q_{V1}$, and $Q_{W1}$ forming push-pull pairs therewith, and therefore the description about the energization patterns for the switching elements $Q_{U2}$, $Q_{V2}$, and $Q_{W2}$ is omitted in FIGS. 3C and 3D.

The advance/retard control is to control an increase/decrease in the amount of power generation of the generator 11 by moving the energization period of the switching element toward an advance side or a retard side with respect to the power generation period.

When the battery voltage $V_B$ is the predetermined voltage $V_T$ or more, the CPU 161 judges that the charging to the battery 15 is excessive. Then the CPU 161 determines a next estimation period $TE_{i+1}$ and sets the advance pattern (see FIG. 3C) as the energization pattern, which starts at the second stage and goes through the sixth stage to the first stage, to decrease the amount of power generation, thereby allowing prevention of excessive charging to the battery 15.

On the other hand, when the battery voltage $V_B$ is less than the predetermined voltage $V_T$, the CPU 161 judges that the charging to the battery 15 is insufficient. Then the CPU 161 determines the next estimation period $TE_{i+1}$ and sets the retard pattern (see FIG. 3D) as the energization pattern, which starts at the sixth stage and goes into the first stage and ends at the fifth stage, to increase the amount of power generation, thereby allowing an increase in the amount of charge to the battery 15.

In this manner, the control circuit 16 executes the advance/retard control so that the battery voltage $V_B$ becomes the predetermined voltage $V_T$ by performing switching among the reference pattern, advance pattern, and retard pattern depending on the state of the battery voltage $V_B$.

Next, referring back to FIG. 2B, the charge control in the case of the occurrence of rotational fluctuation in the prime mover will be described. FIG. 2B shows the relationship between Tp and the energization period of each phase in the case where the power generation period becomes longer due to rotational fluctuation in the prime mover. Note that in FIG. 2B, the above-described timing difference is defined as zero ($\Delta=0$) in order to simplify the explanation.

In an estimation period $TE_2$, Tp is not detected until the end of the estimation period, and further, after a lapse of a period $t_1$, Tp is detected. In this case, after the end of the estimation period $TE_2$, the CPU 161 starts counting of time t from the end of the estimation period while maintaining the energized state or non-energized state of each switching element at the end of the estimation period. It should be noted that hereinafter, maintaining the energized state or non-energized state of each switching element is referred to as the "state maintenance".

When Tp is detected before counting of the time t reaches a predetermined limiting period Tmax, the CPU 161 determines a next estimation period $TE_3$ and starts the next energization period. That is, the count time t1, after the end of the estimation period $TE_2$, does not reach the limiting period Tmax (t1<Tmax), and the state maintenance is performed in the period t1.

In the next estimation period $TE_3$, again, Tp is not detected until the end of the estimation period, and further, after a lapse of a period t2+t3, Tp is detected. Also in this case, after the end of the estimation period $TE_3$, the CPU 161 starts counting of the time t from the end of the estimation period while performing the state maintenance corresponding to the state at the end of the estimation period.

When Tp is not detected and counting of the time t reaches the limiting period Tmax, the CPU 161 sets an all-phase short-circuited state (all phase short-circuit) in which the switching elements $Q_{U1}$, $Q_{V1}$, and $Q_{W1}$ are brought into an open state and the switching elements $Q_{U2}$, $Q_{V2}$, and $Q_{W2}$ are brought into a closed state, and continuously counts the time t. Thereafter, when Tp is detected at the timing at which the period t2+t3 elapses, the CPU 161 determines a next estimation period $TE_4$ and starts the next energization period. That is, after the end of the estimation period $TE_3$, the count time t2 reaches the limiting period Tmax, and the all-phase short-circuited state is set for a period (i.e., the period from t2 to t3) until Tp is detected next.

The limiting period Tmax, which is the maximum state-maintenance period, is set, for example, in proportion to the estimation period TE. That is, the limiting period is calculated by the equation, Tmax=k1·TE, where k1 represents the proportion of the limiting period Tmax to the estimation period TE. Furthermore, the state-maintenance period may be controlled as a predetermined phase angle of the estimation period TE.

<Charge Control>

Figure 4A:
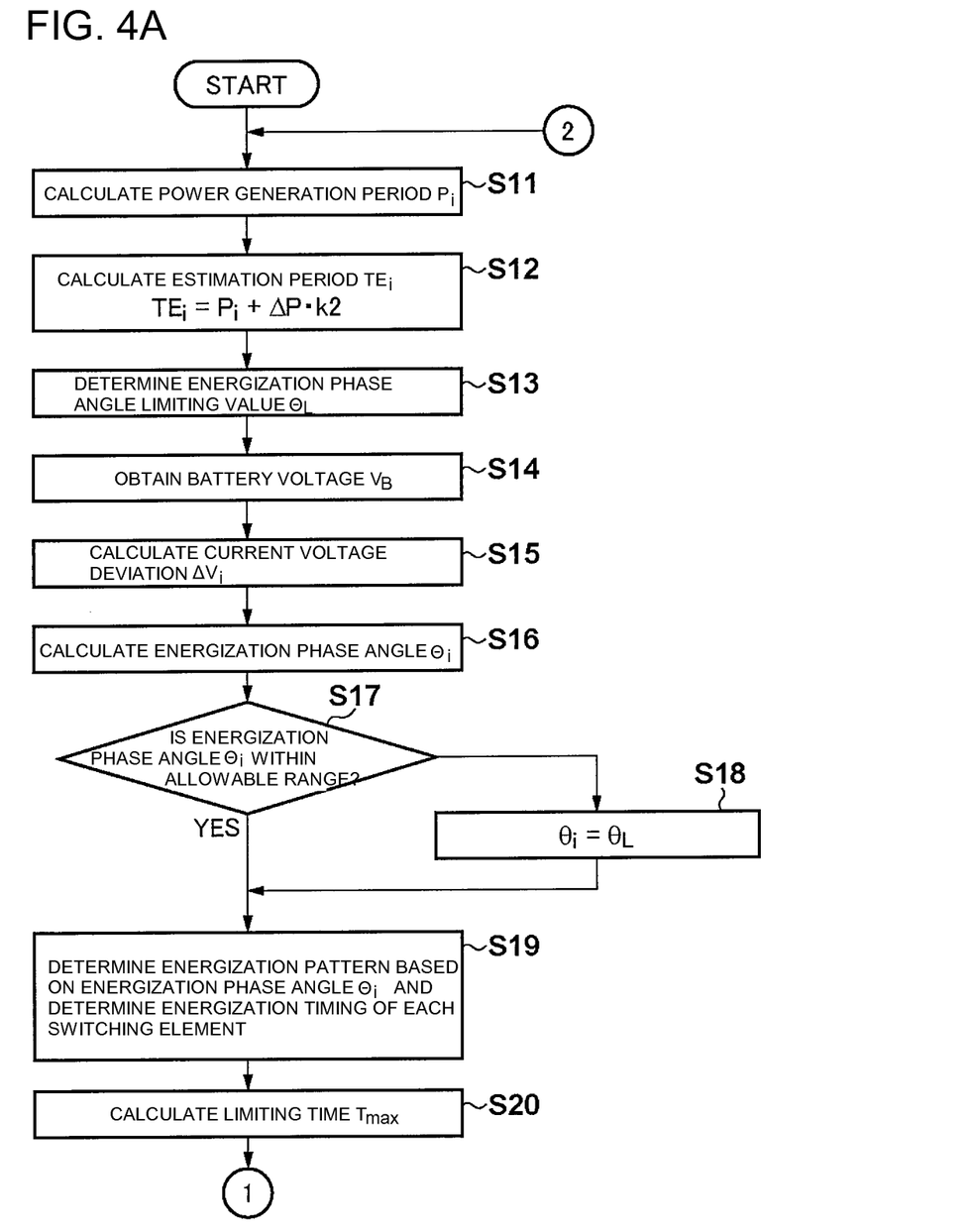
FIG. 4A is a flowchart showing an example of energization control.
Figure 4B:
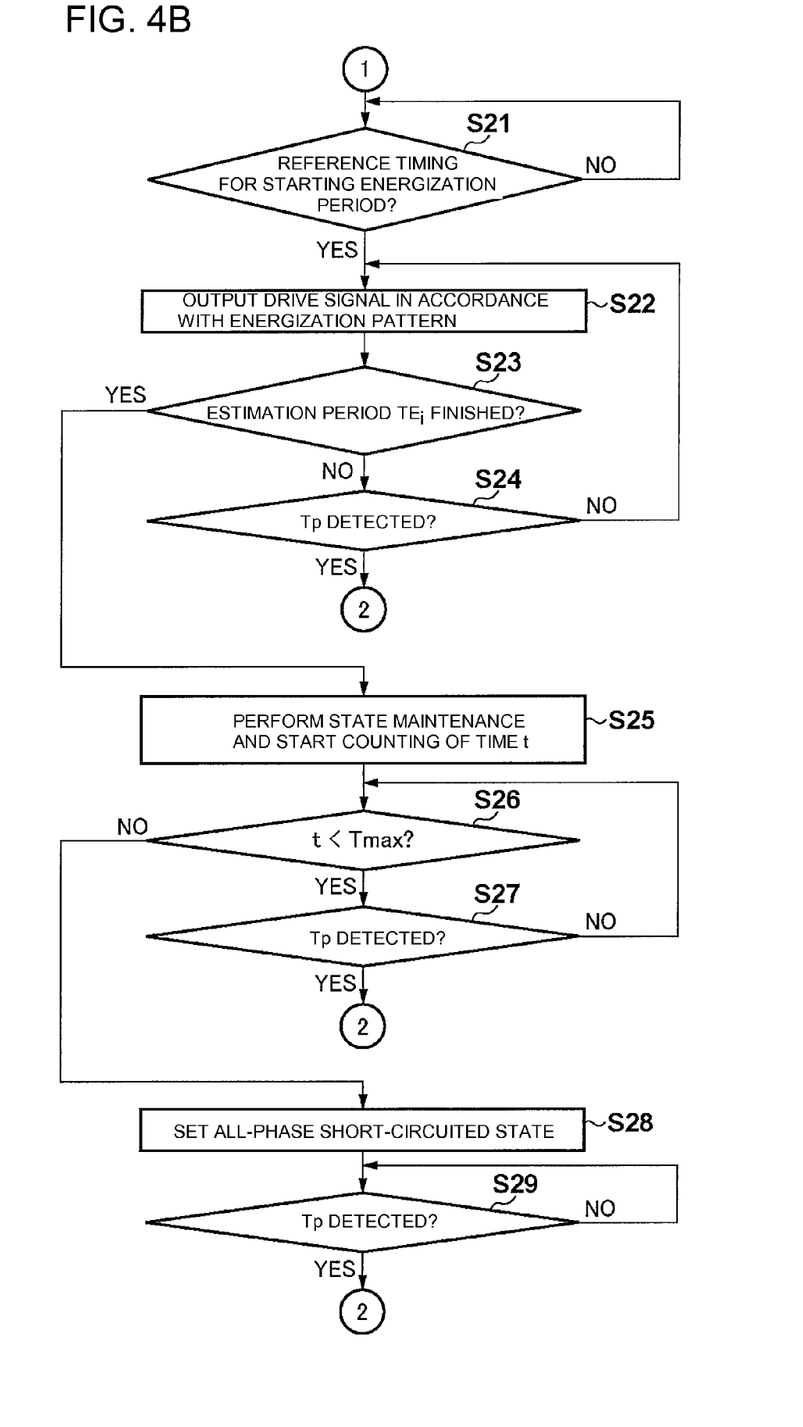
FIG. 4B is a flowchart showing an example of energization control.

FIG. 4 are flowcharts showing an example of energization control. The energization control is executed by the CPU 161 and is a processing for causing the battery voltage $V_B$ to converge to the target voltage $V_T$ under PI control. The CPU 161 constantly monitors the position detection signal Tp, and, when detecting Tp, starts the processing from step S11.

The CPU 161 calculates a power generation period $P_i$ from a first previous Tp detection timing and a second previous Tp detection timing (S11), and calculates an estimation period $TE_i$ in consideration of a variation $\Delta P$ of the power generation period estimated before an electrical angle of, for example, 720°, according to the following equation (S12):

$$TE_i = P_i + \Delta P \cdot k2 \tag{1}$$

where k2 represents a predetermined coefficient.

For example, in the case of calculating the estimation period $TE_0$ shown in FIG. 2A, the first previous Tp detection timing is equivalent to $T_0$; the second previous Tp detection timing is equivalent to $T_{-1}$; and the variation $\Delta P$ estimation timing is equivalent to $T_{-2}$.

Next, the CPU 161 determines, from detection intervals of Tp, an energization phase angle limiting value $\theta_L$ for each of the advance side and the retard side which corresponds to the power generation period (S13). Then the CPU 161 obtains the current battery voltage $V_B$ (S14) and calculates a current voltage deviation $\Delta V_i$ which is the difference between the battery voltage $V_B$ and the target voltage $V_T$ (S15).

Subsequently, the CPU 161 calculates an energization phase angle $\theta_i$ on the basis of the value of the current voltage deviation $\Delta V_i$ (S16) and determines whether or not the calculated energization phase angle $\theta_i$ is within an allowable range (S17). When the energization phase angle $\theta_i$ is out of the allowable range, the CPU 161 changes the energization phase angle $\theta_i$ to the energization phase angle limiting value $\theta_L$ (S18). Then the CPU 161 determines an energization pattern from among the reference pattern, advance pattern, and retard pattern on the basis of the energization phase angle $\theta_i$, and determines an energization timing of each switching element in accordance with the determined energization pattern (S19).

Subsequently, the CPU 161 calculates the limiting period Tmax on the basis of the estimation period $TE_i$ (S20).

Subsequently, the CPU 161 counts the above-described timing difference $TE_i \cdot \Delta/360$ seconds and judges the reference timing for starting the energization period by the detection of Tp (S21). At the reference timing for starting the energization period, the CPU 161 outputs a drive signal for driving each switching element in accordance with the energization timing determined in the step S19 (S22). Then the CPU 161 judges whether or not the estimation period TE$_i$ ends (S23). If it is not ended, the CPU 161 judges whether or not Tp is detected (S24). If Tp is not detected, the CPU 161 returns the processing to the step S22 and continues to output the drive signal. On the other hand, if Tp is detected in the step S24, the CPU 161 returns the processing to the step S11 and repeats the subsequent processing.

If the estimation period TE$_i$ ends before the detection of Tp, the CPU 161 performs the state maintenance and starts counting of the time t (S25). Then the CPU 161 judges whether or not the time t reaches the limiting period Tmax (S26). In the case of t<Tmax, the CPU 161 judges whether or not Tp is detected (S27). If Tp is not detected, the CPU 161 returns the processing to the step S26 and repeats the limiting period judgment. On the other hand, if Tp is detected in the step S27, the CPU 161 returns the processing to the step S11 and repeats the subsequent processing.

When the time t reaches the limiting period Tmax before the detection of Tp, the CPU 161 sets the all-phase short-circuited state (S28). Then the CPU 161 judges whether or not Tp is detected (S29), and, if it is detected, the CPU 161 returns the processing to the step S11 and repeats the subsequent processing.

It should be noted that the flows shown in FIG. 4 are illustrative only and may be any flow as long as it allows the achievement of processing, such as the control of the battery voltage V$_B$ by the advance/retard control, the control in the state-maintenance period, or the setting of the all-phase short-circuited state after the end of the state-maintenance period.

In this manner, when the estimation period is shorter than the actual power generation period, after the end of the estimation period, the state maintenance is performed and the electricity for charging is extracted from the generator 11. Thus, it is possible to suppress a decrease in the charging efficiency of the battery 15 when a gap occurs between the power generation period and the energization period. However, if the power generation period is long, and accordingly, the state-maintenance period becomes long, an excessive current might flow to the switching elements. In order to prevent the flow of an excessive current to the switching elements, the limiting period Tmax which is the maximum state-maintenance period is provided, and, when the state-maintenance period reaches the limiting period Tmax, the all-phase short-circuited state is set.

In the above description, the energization period is started with the falling of the position detection signal Tp as a reference. However, the energization period may be started with the rising of the position detection signal Tp as a reference. In that case, the "detection of Tp" and "input of Tp" correspond to the detection of the rising of the position detection signal Tp by the CPU 161.

<Following Rotational Fluctuation>

Figure 5:
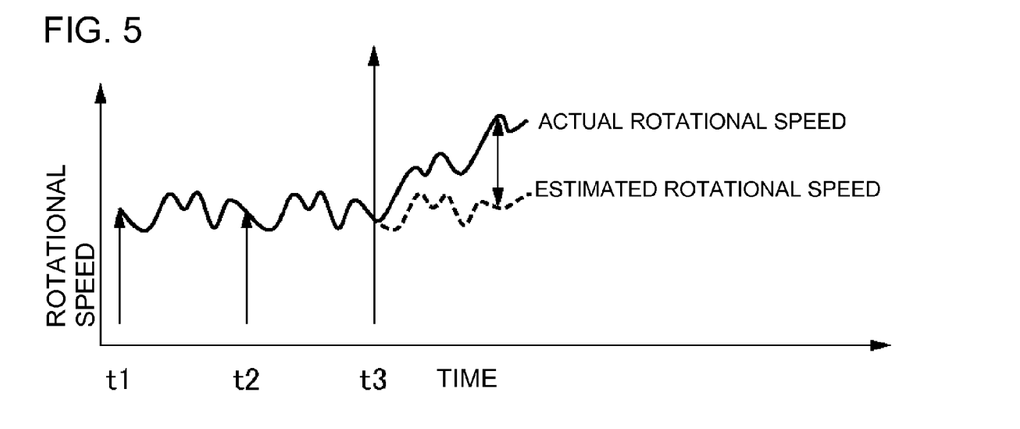
FIG. 5 shows an example of the relationship between an actual rotational speed and an estimated rotational speed of an internal combustion engine.

FIG. 5 shows an example of the relationship between an actual rotational speed and an estimated rotational speed of the internal combustion engine, wherein the estimated rotational speed corresponds to 1/the estimation period. It should be noted that, if the generator 11 has a plurality of poles, the estimated rotational speed corresponds to 1/(the estimated rotational speed×the number of poles of the generator). In FIG. 5, the solid-line curve represents the actual rotational speed of the internal combustion engine, and the dashed curve represents the estimated rotational speed. Furthermore, the up arrow represents a throttle opening.

Because there is no significant change in throttle opening between timing t1 and t2 and the fluctuation in actual rotational speed is relatively small, the rotational speed estimated on the basis of the position detection signal Tp outputted by the position detection unit 17 is substantially consistent with the actual rotational speed. However, the rotation of a throttle grip after the timing t2 causes a major change in throttle opening between the timing t2 and timing t3. As a result, the estimated rotational speed becomes lower than the actual rotational speed due to an increase in actual rotational speed, leading to a difference between the actual rotational speed and the estimated rotational speed.

In other words, if the power generation period is estimated on the basis of the position detection signal Tp outputted by the position detection unit 17, when a rotational fluctuation occurs in the internal combustion engine, the actual power generation period changes with respect to the estimated power generation period, resulting in the occurrence of a period of time during which generated electric power cannot be efficiently stored in the battery 15.

Hereinafter, the amount of change in throttle opening which causes a difference between the estimated power generation period and the actual power generation period is referred to as an "opening change threshold". In FIG. 5, the amount of change in the throttle opening at the timing t3 with respect to the throttle opening at the timing t2 exceeds the opening change threshold.

Figure 6:
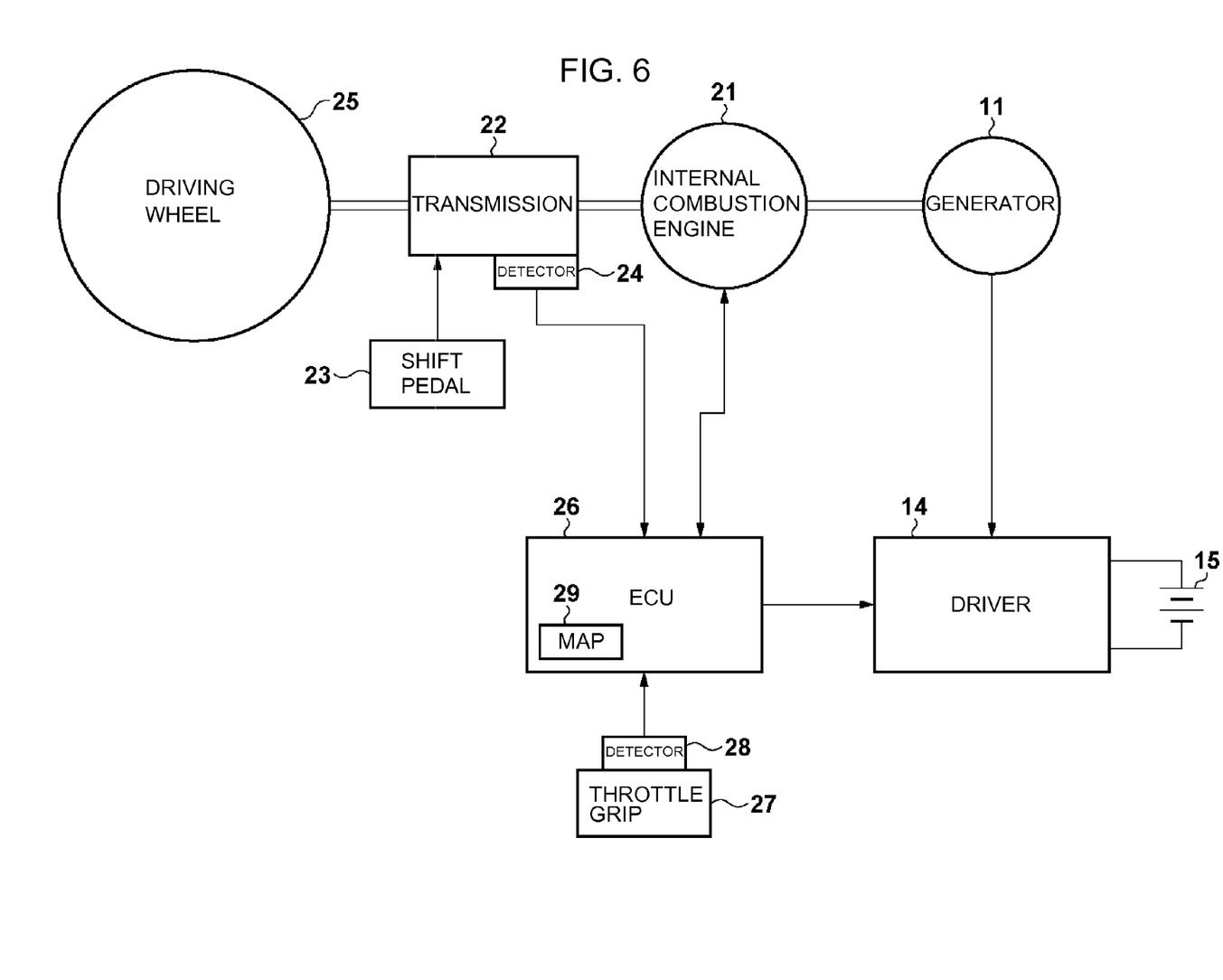
FIG. 6 is a block diagram showing an example of the connection for efficiently charging a battery following a rotational fluctuation.

FIG. 6 is a block diagram showing an example of the connection for efficiently charging the battery 15 following a rotational fluctuation. It should be noted that like reference signs are used for the same elements as shown in FIG. 1, and a detailed description thereof will not be repeated. It should be also noted that, on the assumption that the control circuit 16 shown in FIG. 1 exists in an electronic control unit (ECU) 26, the description thereof is omitted.

Referring to FIG. 6, the rotor 12 of the generator 11 is connected to the internal combustion engine 21 through gears, chain, belt and the like, and rotates based on the rotation of the internal combustion engine 21. A transmission 22 is disposed between the internal combustion engine 21 and a driving wheel 25 of the vehicle. The rotation of the internal combustion engine 21 is decelerated by the transmission 22 and transmitted to the driving wheel 25. The shift position of the transmission 22 is operated by a shift pedal 23 disposed on a side surface of the vehicle.

The ECU 26 can detect a shift position of the transmission 22 through a detector 24 disposed on the transmission 22. Furthermore, the ECU 26 detects an operating state (rotational angle) of a throttle grip 27 disposed on a handlebar of the vehicle, as a throttle opening through a detector 28 and controls the rotation of the internal combustion engine 21 in accordance with the throttle opening.

The transmission 22 which allows an occupant to operate the shift position with the shift pedal 23 is shown for example in FIG. 6. However, the transmission 22 may be such that the shift position is controlled by the ECU 26 in response to the operation of a shift up/down switch disposed on the handlebar of the vehicle, or on the basis of the vehicle speed, the rotational speed of the internal combustion engine 21, etc.

Figure 7:
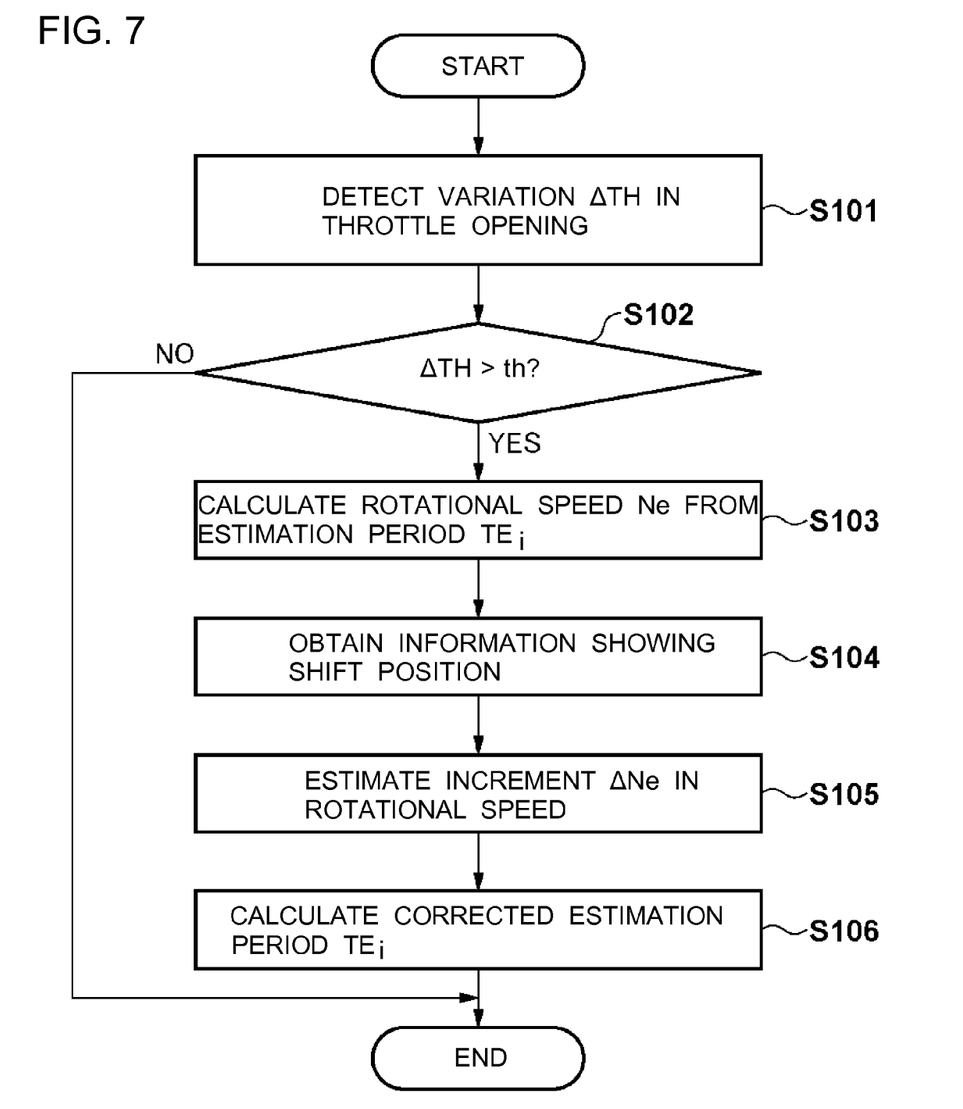
FIG. 7 is a flowchart showing an example of the processing for correcting an estimated power generation period.

FIG. 7 is a flowchart showing an example of the processing for correcting the estimated power generation period. After the calculation of the estimation period TE$_i$ shown in FIG. 4A (S12), the correction processing is performed by the CPU 161 of the control circuit 16 before the calculation of the limiting period Tmax (S20).

The CPU 161 detects a variation ΔTH in throttle opening (S101). It should be noted that the variation ΔTH is detected, for example, as a rotational angle of the throttle grip 27 per millisecond. Then the CPU 161 judges whether or not the variation ΔTH exceeds the above-described opening change threshold th (S102), and, if it is equal to or smaller than the opening change threshold (ΔTH≤th), the processing is ended.

On the other hand, if the variation exceeds the opening change threshold (ΔTH>th), the CPU 161 calculates a rotational speed Ne corresponding to the rotational speed of the internal combustion engine 21 from the estimation period $TE_i$ calculated in the step S12, according to the following equation (S103):

$$Ne = k3/TE_i \qquad (2)$$

where k3 represents a coefficient for converting the reciprocal (rotational speed of the rotor 12) of the estimation period into the rotational speed of the internal combustion engine 21.

Next, the CPU 161 obtains information showing the shift position of the transmission 22 (S104). Then the CPU 161 estimates an increment ΔNe in the rotational speed of the internal combustion engine 21 using map data 29 (S105).

Figure 8:
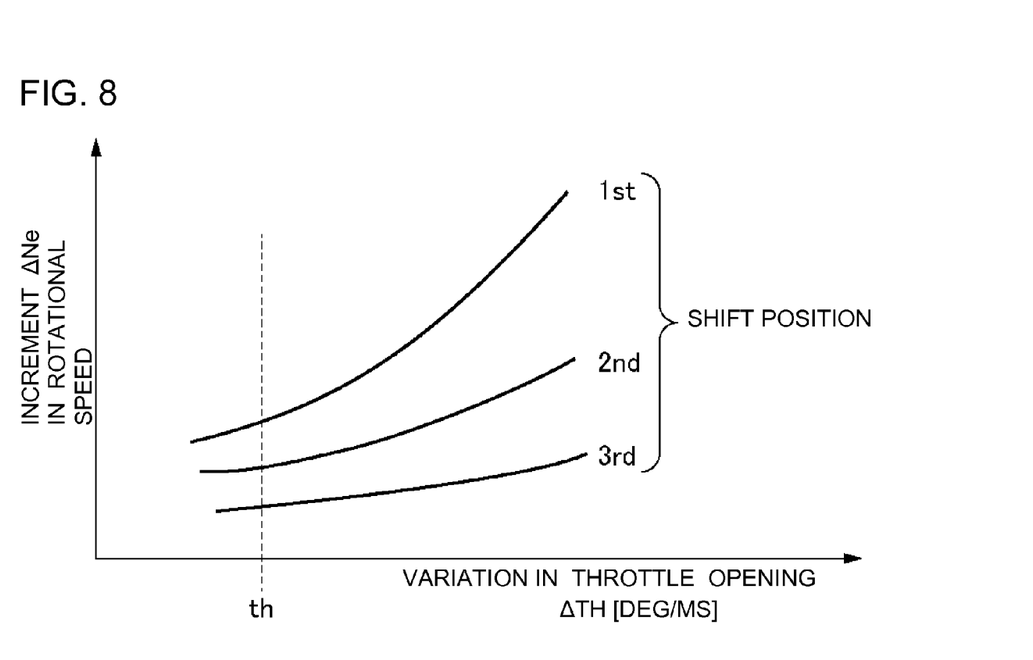
FIG. 8 shows an example of map data.

FIG. 8 shows an example of the map data 29. The map data 29 represent the increment ΔNe [rpm/ms] in the rotational speed of the internal combustion engine 21 with respect to the variation ΔTH [deg/ms] in throttle opening, with the shift position of the transmission 22 as a parameter. It should be noted that the map data 29 are preliminarily measured and stored in the ROM 163 or the like. That is, the CPU 161 obtains, as an estimated value in the step S105, the increment ΔNe in rotational speed corresponding to the variation ΔTH by referring to the curve of the map data 29 corresponding to the shift position of the transmission 22.

Next, the CPU 161 calculates a corrected estimation period $TE_i$ from the rotational speed Ne calculated in the step S103 and the increment ΔNe in rotational speed obtained in the step S105, according to the following equation (S106):

$$TE_i = k3/(Ne+\Delta Ne) \qquad (3),$$

and the correction processing is ended.

In this manner, if the variation ΔTH in throttle opening exceeds the opening change threshold th, the processing after the step S20 in the energization control shown in FIGS. 4A and 4B is performed on the basis of the corrected estimation period $TE_i$. As a result, a correction in accordance with a rotational fluctuation in the internal combustion engine is made to the estimated power generation period, thereby preventing a difference between the estimated power generation period and the actual power generation period. Thus, generated electric power can be efficiently stored in the battery 15.

The embodiment of the present invention includes the following constitution.

A first aspect of the embodiment of the invention is that a battery charging apparatus for a vehicle includes: a driver unit (14) that converts three-phase AC power outputted from a winding of each phase of a stator (13) of a three-phase AC generator (11) into DC power using a plurality of switching elements ($Q_{U1}, \ldots, Q_{W2}$) to supply the DC power to a battery (15); a control unit (16) that controls switching between an energized state and non-energized state of each of the plurality of switching elements; and a position detection unit (17) that outputs a position detection signal (Tp) indicating a position of a rotor (12) of the three-phase AC generator. The control unit obtains a next estimation power generation period (TE) of the three-phase AC generator on the basis of the previous position detection signal and determines a next energization period of each of the plurality of switching elements on the basis of the estimation power generation period. The control unit judges start of the energization period on the basis of input of the position detection signal, and, if a period until next input of the position detection signal exceeds the energization period, during the period until the next input of the position detection signal, the control unit has a maintenance period in which the plurality of switching elements are maintained in the energized state or non-energized state immediately before the period until the next input of the position detection signal exceeds the energization period.

A second aspect of the embodiment of the invention is that the maintenance period is limited up to a predetermined period (Tmax).

A third aspect of the embodiment of the invention is that an input period of the position detection signal is determined by an interval between falling edges or between rising edges of the position detection signal, and the control unit obtains the estimation power generation period on the basis of a previous input period of the position detection signal and a variation (ΔP) thereof.

A fourth aspect of the embodiment of the invention is that, if the next input of the position detection signal is not given even after a lapse of the predetermined period, the control unit switches the plurality of switching elements to an all-phase short-circuited state during the period until the next input of the position detection signal.

A fifth aspect of the embodiment of the invention is that the predetermined period is changed in proportion to the estimation power generation period.

A sixth aspect of the embodiment of the invention is that the predetermined period is a period of a predetermined phase angle of the estimation power generation period.

A seventh aspect of the embodiment of the invention is that the control unit includes an energization pattern with a preset order of switching between the energized state and non-energized state of each of the plurality of switching elements in the energization period, and the control unit determines a next energization timing of each of the switching elements in accordance with the energization pattern upon every input of the position detection signal.

An eighth aspect of the embodiment of the invention is that the energization pattern sets the energization timing of the switching element connected to each phase of the three-phase AC generator, and the control unit simultaneously determines and updates the next energization timing of the switching element connected to each phase upon every input of the position detection signal.

A ninth aspect of the embodiment of the invention is that the control unit detects a voltage ($V_B$) of the battery, and controls the energization timing to an advance side or a retard side so that the voltage of the battery becomes a predetermined voltage ($V_T$); the energization pattern includes an advance pattern and a retard pattern; and the control unit determines the energization timing of the switching element in accordance with the advance pattern or the retard pattern.

A tenth aspect of the embodiment of the invention is that the battery charging apparatus further includes a throttle opening detector (28) for detecting a throttle opening of an internal combustion engine (21). The rotor rotates based on rotation of the internal combustion engine (21). The control unit corrects the estimation power generation period on the basis of a variation in the throttle opening.

An eleventh aspect of the embodiment of the invention is that the battery charging apparatus further includes a shift position detector (24) for detecting a shift position of a transmission (22) disposed between the internal combustion engine and a driving wheel (25) of the vehicle. The control unit corrects the estimation power generation period on the basis of the variation in the throttle opening and the shift position.

A twelfth aspect of the embodiment of the invention is that the control unit includes as map data (29) a predetermined variation in rotational speed of the internal combustion engine based on the variation in the throttle opening and the shift position and corrects the estimation power generation period on the basis of the map data.

According to the first aspect of the embodiment of the invention, even when an actual power generation period becomes longer relative to the estimation power generation period due to the occurrence of rotational fluctuation, the generated electricity can be efficiently stored in the battery.

According to the second aspect of the embodiment of the invention, the flow of an excessive current to the switching elements can be prevented.

According to the third aspect of the embodiment of the invention, the estimation accuracy of the power generation period is improved, and the generated electricity can be efficiently stored in the battery.

According to the fourth aspect of the embodiment of the invention, the flow of an excessive current to the switching elements can be prevented.

According to the fifth aspect of the embodiment of the invention, the time period when the switching element is maintained in the energized state or the non-energized state can be set to the time corresponding to the rotational fluctuation.

According to the sixth aspect of the embodiment of the invention, the predetermined period can be changed in accordance with the estimation power generation period.

According to the seventh aspect of the embodiment of the invention, the energization timing can be determined by the preliminarily prepared energization pattern. Thus, the control load is lightened, and responsiveness is improved.

According to the eighth and ninth aspects of the embodiment of the invention, the energization timing of the switching element connected to each phase can be simultaneously determined and updated by the preliminarily prepared energization pattern. Thus, the control load is lightened, and responsiveness is improved.

According to the tenth to twelfth aspects of the embodiment of the invention, even if the actual power generation period changes with respect to the estimation power generation period due to the occurrence of a rotational fluctuation in the internal combustion engine, generated electric power can be efficiently stored in the battery.

Obviously, numerous modifications and variations of the present invention are possible in light of the above teachings. It is therefore to be understood that within the scope of the appended claims, the invention may be practiced otherwise than as specifically described herein.

What is claimed is:

1. A battery charging apparatus for a vehicle, comprising:
   a driver unit that converts three-phase AC power outputted from a winding of each phase of a stator of a three-phase AC generator into DC power using a plurality of switching elements to supply the DC power to a battery;
   a control unit that controls switching between an energized state and non-energized state of each of the plurality of switching elements; and
   a position detection unit that outputs a position detection signal indicating a position of a rotor of the three-phase AC generator,
   the control unit obtaining a next estimation power generation period of the three-phase AC generator on the basis of the previous position detection signal and determining a next energization period of each of the plurality of switching elements on the basis of the estimation power generation period,
   wherein the control unit judges start of the energization period on the basis of input of the position detection signal, and, if a period until next input of the position detection signal exceeds the energization period, during the period until the next input of the position detection signal, the control unit has a maintenance period in which the plurality of switching elements are maintained in the energized state or non-energized state immediately before the period until the next input of the position detection signal exceeds the energization period.

2. The battery charging apparatus for the vehicle according to claim 1, wherein the maintenance period is limited up to a predetermined period.

3. The battery charging apparatus for the vehicle according to claim 1, wherein an input period of the position detection signal is determined by an interval between falling edges or between rising edges of the position detection signal, and the control unit obtains the estimation power generation period on the basis of a previous input period of the position detection signal and a variation thereof.

4. The battery charging apparatus for the vehicle according to claim 2, wherein, if the next input of the position detection signal is not given even after a lapse of the predetermined period, the control unit switches the plurality of switching elements to an all-phase short-circuited state during the period until the next input of the position detection signal.

5. The battery charging apparatus for the vehicle according to claim 2, wherein the predetermined period is changed in proportion to the estimation power generation period.

6. The battery charging apparatus for the vehicle according to claim 2, wherein the predetermined period is a period of a predetermined phase angle of the estimation power generation period.

7. The battery charging apparatus for the vehicle according to claim 1, wherein the control unit includes an energization pattern with a preset order of switching between the energized state and non-energized state of each of the plurality of switching elements in the energization period, and
   the control unit determines a next energization timing of each of the switching elements in accordance with the energization pattern upon every input of the position detection signal.

8. The battery charging apparatus for the vehicle according to claim 7, wherein the energization pattern sets the energization timing of the switching element connected to each phase of the three-phase AC generator, and
   the control unit simultaneously determines and updates the next energization timing of the switching element connected to each phase upon every input of the position detection signal.

9. The battery charging apparatus for the vehicle according to claim 7, wherein the control unit detects a voltage of the battery, and controls the energization timing to an advance side or a retard side so that the voltage of the battery becomes a predetermined voltage;

the energization pattern includes an advance pattern and a retard pattern; and the control unit determines the energization timing of the switching element in accordance with the advance pattern or the retard pattern.

10. The battery charging apparatus for the vehicle according to claim 1, further comprising a throttle opening detector for detecting a throttle opening of an internal combustion engine, wherein the rotor rotates based on rotation of the internal combustion engine, and the control unit corrects the estimation power generation period on the basis of a variation in the throttle opening.

11. The battery charging apparatus for the vehicle according to claim 10, further comprising a shift position detector for detecting a shift position of a transmission disposed between the internal combustion engine and a driving wheel of the vehicle, wherein the control unit corrects the estimation power generation period on the basis of the variation in the throttle opening and the shift position.

12. The battery charging apparatus for the vehicle according to claim 11, wherein the control unit includes as map data a predetermined variation in rotational speed of the internal combustion engine based on the variation in the throttle opening and the shift position and corrects the estimation power generation period on the basis of the map data.

13. A battery charging apparatus for a vehicle, comprising:

a driver comprising switching elements to convert three-phase AC power outputted from a winding of each phase of a stator of a three-phase AC generator into DC power to supply the DC power to a battery;

a position detector configured to output a position detection signal indicating a position of a rotor of the three-phase AC generator; and a controller configured to control the switching elements to be switched between an energized state and non-energized state, the controller being configured to obtain an estimation power generation period of the three-phase AC generator based on the position detection signal, to determine an energization period of each of the switching elements based on the estimation power generation period, and to determine start of the energization period based on input of the position detection signal, the controller being configured to have a maintenance period during a period until next input of the position detection signal if the period exceeds the energization period, the switching elements being to be maintained in the maintenance period in the energized state or non-energized state immediately before the period exceeding the energization period.

14. The battery charging apparatus according to claim 13, wherein the maintenance period is limited up to a predetermined period.

15. The battery charging apparatus according to claim 13, wherein an input period of the position detection signal is determined based on an interval between falling edges or between rising edges of the position detection signal, and the controller obtains the estimation power generation period based on the input period of the position detection signal and a variation of the input period.

16. The battery charging apparatus according to claim 14, wherein, if the next input of the position detection signal is not given after a lapse of the predetermined period, the controller switches the switching elements to an all-phase short-circuited state during the period until the next input of the position detection signal.

17. The battery charging apparatus according to claim 14, wherein the predetermined period is changed in proportion to the estimation power generation period.

18. The battery charging apparatus according to claim 14, wherein the predetermined period comprises a period of a predetermined phase angle of the estimation power generation period.

19. The battery charging apparatus according to claim 13, wherein the controller includes an energization pattern with a preset order of switching between the energized state and non-energized state of each of the switching elements in the energization period, and the controller determines a next energization timing of each of the switching elements in accordance with the energization pattern upon every input of the position detection signal.

20. The battery charging apparatus according to claim 19, wherein the energization pattern sets a energization timing of a switching element among the switching elements connected to each phase of the three-phase AC generator, and the controller simultaneously determines and updates the next energization timing of the switching element connected to each phase of the three-phase AC generator upon every input of the position detection signal.

21. The battery charging apparatus according to claim 19, wherein the controller detects a voltage of the battery and controls the next energization timing to an advance side or a retard side so that the voltage of the battery becomes a predetermined voltage;

the energization pattern includes an advance pattern and a retard pattern; and the controller determines the next energization timing of a switching element among the switching elements in accordance with the advance pattern or the retard pattern.

22. The battery charging apparatus according to claim 13, further comprising a throttle opening detector for detecting a throttle opening of an internal combustion engine, wherein the rotor rotates based on rotation of the internal combustion engine, and the controller corrects the estimation power generation period based on a variation in the throttle opening.

23. The battery charging apparatus according to claim 22, further comprising a shift position detector for detecting a shift position of a transmission disposed between the internal combustion engine and a driving wheel of the vehicle, wherein the controller corrects the estimation power generation period based on the variation in the throttle opening and the shift position.

24. The battery charging apparatus according to claim 23, wherein the controller includes as map data a predetermined variation in rotational speed of the internal combustion engine based on the variation in the throttle opening and the shift position and corrects the estimation power generation period based on the map data.

* * * * *